Patented May 23, 1939

2,159,349

UNITED STATES PATENT OFFICE 2,159,349

CASTING BODIES

Albert Lee Bennett, Glendale, Calif., assignor to Malinite Corporation, Los Angeles, Calif., a corporation of California No Drawing. Application May 14, 1934,
Serial No. 725,653

7 Claims. (Cl. 106—11)

This invention relates to ceramic compositions which are capable of being used in casting or otherwise forming bodies such as vases, jugs, bowls, dinnerware, or other curved, shaped, or fashioned articles. For purposes of simplicity, the method of fashioning such bodies will be termed "casting," although such term is not to be limited to that method in which a fluid slurry or slip is poured into porous molds such as plaster molds. The terms "casting" and "casting slips" shall include all methods of forming bodies in which a slurry or slip is used (as distinguished from those methods in which a non-fluid, plastic mass is employed) and includes those methods in which centrifugal action is employed in fashioning the desired shape and/or collecting the solid ingredients of the slurry so as to form a body capable of being dried and burned.

The invention also relates to a method of preparing ceramic ingredients whereby it is now possible to employ minerals which could not be used in casting slips heretofore. Moreover, the invention contemplates the formation of a slip or slurry suitable for use in casting processes as defined hereinabove, which contains but minor proportions of clay and instead utilizes certain plasticizing agents and refractory ceramic ingredients which permit the development of very tough refractory bodies.

Heretofore slips or slurries suitable for casting contained large proportions of clay which was first reduced to a state of fine division, often washed or filtered so as to remove coarser impurities, and then suspended in water so as to form a relatively thin, fluid and pumpable slip.

The composition of this invention, however, contains but relatively small percentages of clay (less than about 30%) and contains minerals such as talc and pyrophyllite or other magnesia-containing minerals which ordinarily can not be used in casting slips because of their flaky nature. When a mineral, such as talc, is ground or blunged to form a slip, the particles retain a flaky form. These flakes quickly coat the surfaces of a casting mold and prevent the absorption of water by the mold so that it is impossible (within any reasonable period of time) to produce a suitable thick deposit of material on the surfaces of the mold because of the resistance offered by the film of flaky particles. I have discovered, however, that when magnesia-containing minerals are calcined or dehydrated while in lump form and these calcined crude lumps are then ground or otherwise reduced to a suitable state of division, the particles do not assume the undesirable flaky form and the material can be successfully used in slips. As a result, the shrinkage characteristics of the bodies may be suitably controlled.

The invention further contemplates the use of a matrix material in a casting slip. By the term "matrix material" as used herein, reference is made to prefused amorphous, relatively low melting point substances or frits such as window glass cullet, bottle glass, soda lime glass, or other previously fused and prepared frits, or highly alkaline natural materials such as sodalite, lepidolite, phonolite, nephelite, syenite, etc., volcanic glasses such as rhyolite and obsidian, colemanite, and other natural materials preferably containing a high proportion of alkalies.

When the above ingredients are compounded in accordance with this invention, a casting slip or composition is obtained whereby it is possible to produce pottery, art-ware, and the like, of much higher strength resistance to wear, and toughness than has heretofore been possible to produce. Moreover, the casting slips of this invention permit the manufacture of pottery and art-ware in a very rapid and economical manner, it being possible to burn the bodies very rapidly and to produce finished ware by means of a single burn instead of the customary bisque and glost burns.

It is an object of this invention, therefore, to disclose and provide a new and improved casting composition.

Another object is to disclose and provide a method of preparing casting compositions whereby magnesia-containing or flaky minerals may be successfully used.

A further object is to disclose and provide a casting composition and method of preparation whereby tough and strong objects may be readily produced.

These and other objects, uses and advantages of this invention will become apparent to those skilled in the art from the following more detailed description of a preferred composition and method of preparation and of certain modifications thereof.

Generally stated, the composition of the solids entering into the formation of a suitable slip may comprise not more than about 30%–35% of clay, not less than 8%–10% by weight of a matrix material, (which can be present in quantities up to about 55%–60%), and from 20% to about 65% by weight of a magnesia-containing material. Attention is called to the fact that by the term "magnesia-containing material" as used herein, reference is made to talc, tremolite, sepiolite, or other magnesia-containing minerals, as well as pyrophyllite or similar material having a flaky structure. Ordinarily, the clay content of the slip may range from 20% to 30%, although smaller proportions of clay may be used. When only 5%–10% of clay is used, it may be desirable to employ a small proportion of a colloidal plasticizing agent such as bentonite, vegetable gums, or a material such as sodium or ammonium alginate.

It has also been found desirable to use sodium solicate or sodium aluminate in the compositions. An illustrative composition containing 35% by weight of a previously calcined and then ground talc, 25% by weight of raw tremolite, 15% by weight of ground matrix material such as common glass, and 25% of a clean, tough, plastic and preferably non-carbonaceous clay, may also contain about 1000 cc. of N brand, 1.42 specific gravity sodium silicate per ton of dry solids in the slip. In the preparation of a casting slip of the above composition, the ingredients are blunged or ball milled to a fluid, relatively thin slip. Approximately two-thirds of the total quantity of sodium silicate which it is desired to add, may be added during the blunging, the last third of the sodium silicate being added during the last few minutes of ball milling or blunging. The slip so prepared may be stored for any desired period of time. Before using, it may be desirable to subject the slip to slight agitation with simultaneous deaeration. It will be found that the slip will ordinarily contain about 28% to 32% of water when it is in a form suitable for casting purposes. The solids will be easily maintained in uniform suspension. During casting, the formed bodies are readily formed and no scumming of alkali will occur on the surface of the liquid during storage.

The solids used in the manufacture of the slip should be crushed so that approximately 95% passes a 150 or 200 mesh sieve. During the preparation of the magnesia-containing or flaky materials, the lump or crude mineral should be calcined to a temperature sufficient to impart strength and rigidity to the lumps. Temperatures of 1000° to 1600° during calcination may be sufficient. The calcined magnesia-containing or flaky material is ground very readily and at a lower cost than the raw materials. After calcination, it is desirable to spray the hot lumps with water so as to shatter the same, thereby facilitating the subsequent grinding operation. In the preferred embodiment of the process, the magnesia-containing material is preliminarily crushed so as to form lumps of 1 to 3 inches in diameter, then passed through a rotary kiln in which the material is heated sufficiently to give a stony, sintered structure to the lumps (1800° F.–2200° F.) the discharge from the kiln being sprayed with water and the calcined and partly shattered material being then ground so that 95% passes a 200 mesh sieve.

It is to be understood that the calcined and then crushed magnesia-containing materials of the character mentioned hereinbefore can be used not only in casting slips but may also be incorporated with advantage in jigger bodies or other plastic ceramic compositions for the manufacture of pottery, art-ware, hotel china, etc.

Instead of simply calcining the magnesia-containing material, a reinforcing agent of even greater effectiveness may be produced by mixing finely ground talc with a matrix material, adding but a very small percentage of a binder (for example, 5% of clay or a small quantity of sodium alginate, gum tragacanth, goulac or lignon extract, etc.), extruding the mixture through an auger so as to compact the same and form bodies or masses, and then burning the bodies or masses to vitrifying or semi-vitrifying temperatures. The mass can be extruded in the form of a rod and then broken up into pieces of desired size before burning the same. As an illustration, a reinforcing agent can be made by intimately mixing 45% of sepiolite or talc with 50% of ground glass and 5% of clay. After intimately mixing and extruding the mass through a die, the extruded material is broken up into pieces ranging from 1 to 4 inches in diameter, and then burned to cone 02 or cone 03. At this temperature the mass will be found to have been rendered substantially vitreous. These masses are then ground to a suitable state of division. When the reinforcing agent is to be used in jiggering bodies, it may be ground so that 90%–95% passes through a 100 mesh sieve. When the reinforcing agent is to be used in casting slips, it is ground so that approximately 95% passes through a 200 mesh sieve. This reinforcing agent is then used in compositions of the character described in this application or in other ceramic bodies. When used in casting slips of the character described hereinabove, allowance must be made for the amount of magnesia-containing mineral and matrix material present in the reinforcing material.

A casting slip capable of being used in the manufacture of hotel china having an absorption of less than 3% or 5%, can be made by using 40% of the reinforcing material described hereinabove, 30% by weight of clay, 20% by weight of ground glass or equivalent matrix material, and 10% by weight of a raw talc or other magnesia-containing material. Upon burning the cast bodies to about cone 03 on a 24 hour schedule (including preheating and cooling), the ware will be found to have a transverse breaking strength of between 10,000 and 12,000 pounds per square inch.

Generally stated, substantially vitreous bodies can be obtained by using the ingredients within the following ranges:

| | Per cent |
|---|---|
| Prepared and substantially vitrified reinforcing agent | 20–60 |
| Raw magnesia-containing material | 0–30 |
| Matrix material high in alkalies | 0–30 |
| Clay or other binder | 25–35 |

When the maximum amount of reinforcing agent is used, the raw talc or the raw matrix material may be completely eliminated.

When a substantially vitreous product is desired, the reinforcing agent should be burned to substantially complete vitrification. When semi-vitreous bodies are desired (having an absorption of about 8%–14%), the reinforcing agent need not be completely vitrified. The proportion of ingredients capable of producing a satisfactory semi-vitreous body may comprise:

| | Per cent |
|---|---|
| Prepared reinforcing agent | 0–50 |
| Clay or other binder | 25–35 |
| Raw magnesia-containing material | 0–50 |
| Matrix material | 10–30 |

A typical composition coming within the above range and found to give splendid results comprised 37.5% of the prepared reinforcing agent, 30% of clay, 15% of matrix material and 17.5% of raw talc.

It is to be understood that when matrix materials high in alkalies are used (such as sodalite, lepidolite, ground glass, etc.), the casting slips need not contain added caustic soda, sodium carbonate, etc. Furthermore, although clay has been specifically mentioned as a suitable binder, materials such as sodium or ammonium alginate, vegetable gums such as gum tragacanth, lignon extract, etc., may be used. The casting slips do not exhibit or give rise to excessive scumming in the tanks nor do they cause "livering" in the molds. Instead, the castings are quickly deposited and the excess slip drains quickly and evenly out of the molds.

Occasionally, when the slips of this invention are permitted to stand for protracted periods of time before being used, they become too thin for casting purposes. Such thin slips may be reconditioned by the careful addition thereto of dilute acid solution. At no time, however, should enough acid be added to render the slips acidic.

All such changes and modifications as come within the scope of the appended claims are embraced thereby.

I claim:

1. A casting composition containing about 30% to 50% of water and from about 50% to 70% by weight of solids in a state of fine division, said solids comprising: about 40% of a substantially vitrified reinforcing agent consisting essentially of naturally flaky magnesia-containing minerals and a matrix material; about 10% of a raw, normally flaky magnesia-containing mineral; about 20% of ground glass; and about 30% of clay.

2. In a method of making casting slips, the steps of: calcining natural minerals characterized by a flake-like structure while said minerals are in lump form to substantially dehydrate the same, then reducing the calcined minerals to a state of fine division, incorporating said calcined minerals with a matrix material relatively high in alkalies and a binder in the proportion of about 20% to 60% by weight of said calcined mineral, 20% to 40% by weight of a plastic clay, and 10% to 30% by weight of a matrix material, and then forming a slip from said mixture by incorporating water in sufficient amount to form a substantially fluid slip.

3. In a method of the character described in claim 2, the step of incorporating from 10% to 30% by weight of finely divided naturally flaky mineral in uncalcined form.

4. A casting slurry containing about 30% to 50% of water and from about 50% to 70% by weight of solids in a state of fine division, about 95% of the solids passing a 150 mesh sieve, said solids comprising: between 25% and 65% by weight of a naturally flaky mineral from the group consisting of talc, tremolite, sepiolite and pyrophyllite, a part at least of said naturally flaky mineral being present in a calcined form; from about 10% to 40% by weight of a binder such as plastic clay; and from about 8% to 35% by weight of a matrix material containing a relatively high proportion of alkalies, said casting slurry being adapted to form ware capable of being burned to maturity at about cone 03.

5. A casting slurry containing about 30% to 50% of water and from about 50% to 70% by weight of solids in a state of fine division, about 95% of the solids passing a 150 mesh sieve, said solids comprising: between 25% and 65% by weight of a naturally flaky mineral from the group consisting of talc, tremolite, sepiolite and pyrophyllite, a part at least of said naturally flaky mineral being present in a calcined form; from about 10% to 40% by weight of a binder such as plastic clay; and from about 8% to 35% by weight of a matrix material containing a relatively high proportion of alkalies from the group consisting of sodalite, lepidolite, phonolite, syenite, colemanite, prefused frits and glasses, said casting slurry being adapted to form ware capable of being burned to maturity at about cone 03.

6. A casting slurry containing from about 30% to 50% of water and from about 50% to 70% by weight of solids in a state of fine division, said solids comprising: between 25% and 65% by weight of a calcined reinforcing agent consisting essentially of a calcined mixture of naturally flaky minerals from the group consisting of talc, tremolite, sepiolite and pyrophyllite, and a matrix material containing a relatively high proportion of alkalies, about 95% of said calcined reinforcing agent passing a 150 mesh sieve; about 10% to 40% by weight of a plastic clay; and from 8% to 35% by weight of a matrix material high in alkalies.

7. A casting slurry containing from about 30% to 50% of water and from about 50% to 70% by weight of solids in a state of fine division, said solids comprising: between 25% and 65% by weight of a calcined reinforcing agent consisting essentially of a calcined mixture of naturally flaky minerals from the group consisting of talc, tremolite, sepiolite and pyrophyllite, and a matrix material containing a relatively high proportion of alkalies, about 95% of said calcined reinforcing agent passing a 150 mesh sieve; about 10% to 30% by weight of a raw naturally flaky mineral in a state of fine division from the group consisting of talc, tremolite, sepiolite and pyrophyllite; about 10% to 40% by weight of a plastic clay; and from 8% to 35% by weight of a matrix material high in alkalies.

ALBERT LEE BENNETT.